(12) United States Patent
Kim

(10) Patent No.: US 9,032,228 B2
(45) Date of Patent: May 12, 2015

(54) STANDBY POWER REDUCING APPARATUS

(75) Inventor: Dong Hee Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 255 days.

(21) Appl. No.: 13/326,857

(22) Filed: Dec. 15, 2011

(65) Prior Publication Data

US 2013/0007485 A1 Jan. 3, 2013

(30) Foreign Application Priority Data

Jun. 30, 2011 (KR) .................. 10-2011-0064442

(51) Int. Cl.
*G06F 1/26* (2006.01)
*H02J 9/00* (2006.01)
*H02M 1/00* (2006.01)

(52) U.S. Cl.
CPC . *H02J 9/005* (2013.01); *G06F 1/26* (2013.01); *H02M 2001/0032* (2013.01); *Y02B 70/16* (2013.01)

(58) Field of Classification Search
USPC ......... 713/1, 2, 100, 300, 310, 320, 321, 322, 713/323, 324, 330, 340, 375
See application file for complete search history.

(56) References Cited

U.S. PATENT DOCUMENTS 5,642,004 A * 6/1997 Bircher ............... 307/66
5,886,424 A * 3/1999 Kim ................... 307/64
6,362,980 B1 * 3/2002 Ohashi et al. ........... 363/21.01
6,909,621 B2 * 6/2005 Lee ................... 363/81
2004/0052093 A1 * 3/2004 Kim ................... 363/21.01
2010/0061121 A1 * 3/2010 Udagawa .............. 363/16
2010/0265231 A1 * 10/2010 Jang ................. 345/211

FOREIGN PATENT DOCUMENTS

KR 10-2004-0037629 A 5/2004
KR 10-2011-0027520 A 3/2011

OTHER PUBLICATIONS

Office Action dated Jun. 24, 2013 in Korean Application No. 10-2011-0064442, filed Jun. 30, 2011.
Office Action dated Oct. 31, 2012 in Korean Application No. 10-2011-0064442, filed Jun. 30, 2011.

* cited by examiner

*Primary Examiner* — Kim Huynh
*Assistant Examiner* — Paul J Yen
(74) *Attorney, Agent, or Firm* — Saliwanchik, Lloyd & Eisenschenk

(57) ABSTRACT

A standby power reducing module according to an embodiment includes a AC rectification unit; a resonance unit electrically connected to the AC rectification unit and dropping DC voltage; a microcomputer connected to the resonance unit and controlling all operations of a system; a power blocking unit electrically connected to the microcomputer and blocking output voltage of the resonance unit when the system is switched into standby mode; and a independent power supplying unit supplying the standby power to the microcomputer when the system is switched into the standby mode.

11 Claims, 3 Drawing Sheets

STANDBY POWER REDUCING APPARATUS

CROSS-REFERENCE TO RELATED APPLICATION

This application claims the benefit under 35 U.S.C. §119 of Korean Patent Application No. 10-2011-0064442, filed Jun. 30, 2011, which is hereby incorporated by reference in its entirety.

BACKGROUND

1. Technical Field

The present invention relates to a standby power reducing apparatus and method, and more particularly, to the standby power reducing apparatus and method capable of reducing power to be consumed when electrical or electronic equipments such as TV, audio and computer are in the powered off standby state.

2. Description of the Related Art

Electrical equipments such as TV or audio controlling operations using a remote controller or the electrical equipments that consumes the power prior to original operations, like the standby lamp turns on, have the standby mode. Although the electrical equipments having the standby mode are powered off, if a power plug is connected to the external power, the power consumption occurs.

In general, the power consumed as the standby power per each of electrical equipments is small, that is, 1 W~25 W. However, the power summing the energy waste due to the standby power of such equipments is enormous in size. In addition, carbon dioxide usually occurs to about 4 kg on average to produce power 1 KW, and therefore, when neglecting the standby power, the global warming may be further deepened. Therefore, to save the energy and preserve the global environment, it is necessary to prevent the energy waste due to the standby power.

FIG. 1 is a circuit diagram showing a saving apparatus saving standby power consumption in the related art. In FIG. 1, the saving apparatus includes a rectification unit 10 receiving AC power and converting the received AC power into DC power, a transformer 20 receiving and transforming DC voltage input from the rectification unit 10, a diode D connected to a secondary side of the transformer 20, a condenser C in parallel connected to the diode D and charging the voltage output from the secondary side of the transformer 20 to supply driving voltage Vcc to a remote controller receiving unit 30 and a microcomputer 40, a feedback portion 50 sensing the voltage output from the condenser C, and a PWM controller 60 receiving the sensed voltage from the feedback portion 50 and outputting PWM signal controlling oscillation operation of the transformer 20.

The feedback portion 50 senses the signal according to power supply on/off of the microcomputer 40 and the voltage output from the condenser C, and outputs the sensed feedback signal to the PWM controller 60. That is, the feedback 50 produces the feedback signal for controlling the PWM controller 60 so that the PWM signal having a predetermined period is supplied in the standby mode supplying a predetermined driving voltage Vcc from the remote controller receiving portion 30 and the microcomputer 40 when the power supply is turned off.

The PWM controller 60 supplies the PWM signal having a predetermined period according to the feedback signal received from the feedback portion 50, that is, the PWM signal to be turned on/off by the period of 100 ms in the standby mode to the primary side of the transformer 20.

Therefore, the transformer 20 is turned on/off by the period of 100 ms, that is, the voltage input from the rectification unit 10 by the period of 100 ms receives from the primary side of the transformer 20, the received voltage is transformed to the predetermined voltage, and the transformed voltage is output through the secondary side. The diode D is driven into ON-state by the voltage output through the second side of the transformer 20 to charge the voltage into the condenser C, and the charged voltage in the condenser C is used as driving voltage Vcc of the remote controller receiving unit 30 and the microcomputer 40.

In these operations, although the power supply of the electronic equipments is turned off, the remote controller receiving unit 30 receives a predetermined driving voltage Vcc to receive requests of users (remote controller signal).

As such, in the standby mode, as the predetermined of driving voltage is supplied to the remote controller receiving unit 30 and the microcomputer 40, the standby power of about 1 W~3 W is consumed. To save the standby power as above, there is a discomfort that each of consumers should be unplugged the plug of electronic when not using the electronic equipments.

BRIEF SUMMARY

The present invention may reduce real standby power by an independent power.

The present invention may reduce the standby power while normally operating electronic equipments in the standby state by periodically flowing the minimum power required for driving electrical equipments in the standby state of the electrical equipments.

A standby power reducing module according to an embodiment includes an AC rectification unit; a resonance unit electrically connected to the AC rectification unit and dropping DC voltage; a microcomputer connected to the resonance unit and controlling all operations of a system; a power blocking unit electrically connected to the microcomputer and blocking output voltage of the resonance unit when the system is switched into standby mode; and an independent power supplying unit supplying the standby power to the microcomputer when the system is switched into the standby mode.

DETAILED DESCRIPTION

Figure 1:
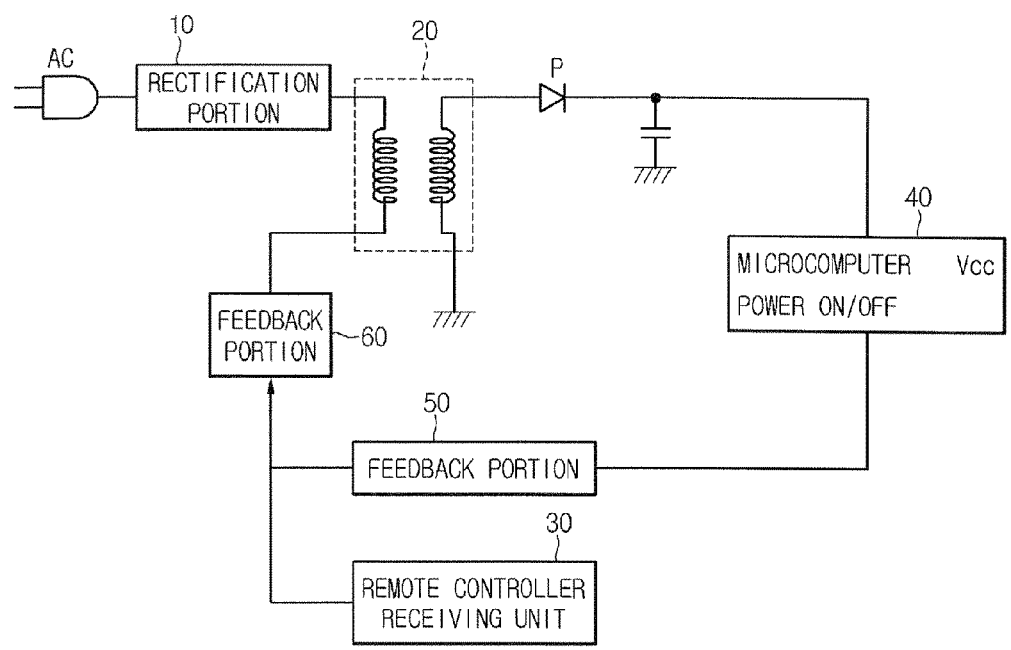
FIG. 1 is a circuit diagram showing a saving device saving standby-power consumption in the related art.

Hereinafter, an exemplary embodiment of the present invention will be described in detail with reference to the accompanying drawings. The specifics of other embodiments are included in the detailed description and drawings. Benefits and features of the invention and how to achieve them will become clear when referencing exemplary embodiments to be described below in detail along with the accompanying drawings. The same reference numerals refer to identical components in the entire specification.

Figure 2:
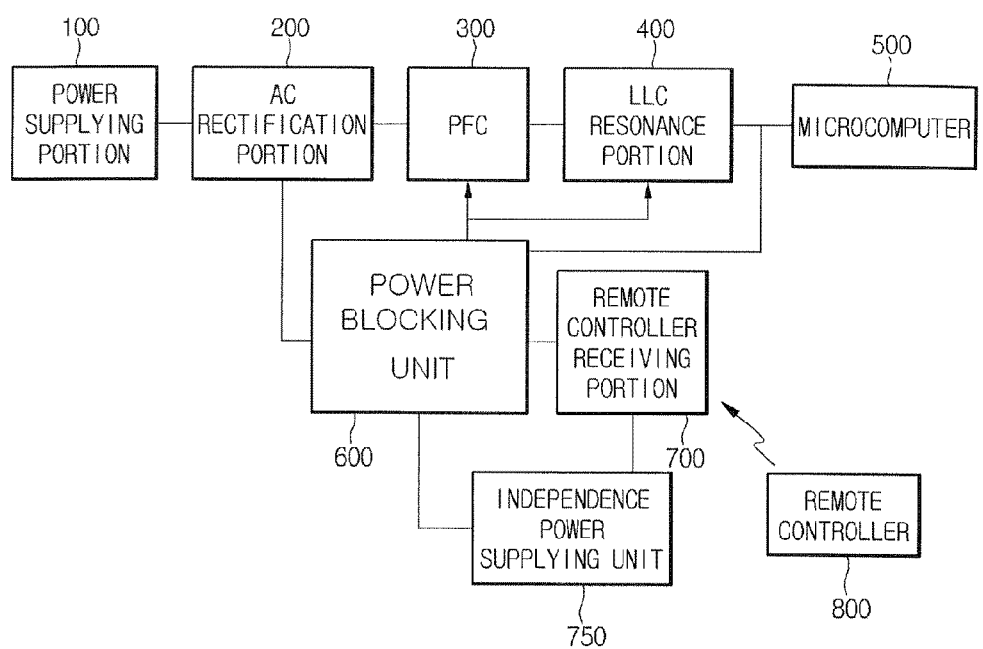
FIG. 2 shows configurations of a standby-power reducing system according to an exemplary embodiment of the present invention.

FIG. 2 shows configurations of a standby power reducing system according to an exemplary embodiment of the present invention.

As shown in FIG. 2, the standby power reducing system of the present invention includes a power supplying unit 100, an AC rectification unit 200, a PFC (Power Factor Correction) unit 300, a LLC resonance unit 400, a microcomputer 500, a power blocking unit 600, a remote controller receiving unit 700, and an independent power supplying unit 750.

The power supplying unit 100 supplies AC power. The AC power to be supplied is commercial AC power, and the power supplying unit 100 may supply AC voltage in the range of 90V to 264V.

The AC rectification unit 200 receives the AC power supplied from the power supplying unit 100, converts the received AC power into the DC power, and outputs the converted DC power. The AC rectification unit 200 may include a SMPS (switching mode power supply), and the voltage passing through the AC rectification unit 200 may be DC voltage in the range of 120V to 380V.

The voltage passing through the AC rectification unit 200 passes a PFC 300. The PFC 300, which is a power-efficient fixed circuit, supplies stable current and may reduce unnecessarily wasteful power consumption. The voltage passing through the PFC 300 may be, for example, DC voltage of 380V.

A first diode 310 may be connected between the PFC 300 and the power blocking unit 600. The anode of the first diode 310 is connected to the PFC 300, and the cathode may be connected to the power blocking unit 600.

The LLC resonance unit 400 receives the DC voltage passing through the PFC 300, and the received DC voltage is transformed by a transformer. That is, the voltage input from the PFC 300 is applied to a primary side LLC of the resonance unit 400, the applied voltage is transformed into a predetermined voltage, and the transformed voltage outputs through a secondary side of the resonance unit 400. The voltage output through the secondary side is supplied as the voltage required for driving the microcomputer 500 and the remote controller receiving unit 700. The voltage output through the secondary side 500 may have, for example, the values of 24V, 12V, 6V. The LLC resonance unit 400 applies for example, the voltage of 6V to the microcomputer 500 and the remote controller receiving unit 700.

The microcomputer 500 provides turn on or off signal for turning on or off the operation of electronic equipments wherein as the predetermined signal is received from the remote controller receiving unit 700, the turn on signal turning on (normal mode) the operation of electronic equipments is applied to the power blocking unit 600. Otherwise (standby mode), the turn off signal turning off the operation of electronic equipments is applied to the power blocking unit 600.

The independent power supplying unit 750 is connected to the remote controller receiving unit 700 to supply the power required for the operation of the microcomputer 500 in the standby mode. That is, the independent power supplying unit 750 supplies the power for the standby mode of the electronic equipments to the microcomputer 500, and is for example, solar cell, mercury cell or secondary cell. The independent power supplying unit 750 supplies the DC voltage.

Figure 3:
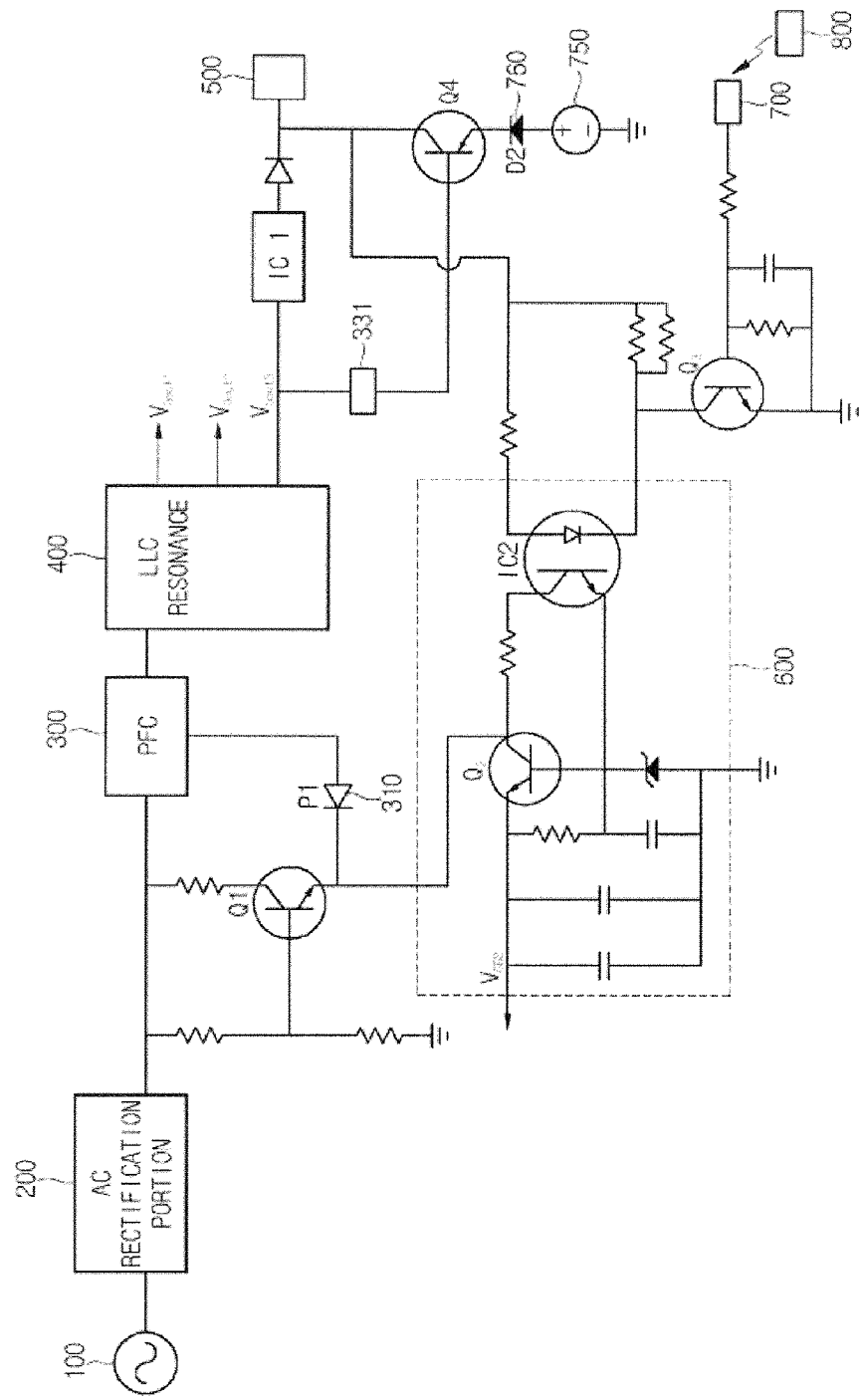
FIG. 3 is a circuit diagram showing an example of a standby-power saving module having a standby-power blocking function according to an embodiment of the present invention.

FIG. 3 is a circuit diagram showing an example of a standby power saving module having a standby power blocking function according to an embodiment of the present invention. The process for operating the standby power reducing apparatus saving the standby power consumption while having above configurations will be described hereinafter.

First, the microcomputer 500 in the standby mode outputs power supply off signal, and therefore, it is possible to block the introduction of the AC power into the electronic equipments. The other components except the microcomputer 500, the remote controller receiving unit 700, the independent power supplying unit 750 in the standby mode is not active. When the external input requesting the operation in the standby mode is produced by, for example, a remote controller 800, the microcontroller 500 to be active produces control signal for controlling other components.

In the standby mode, the independent power supplying unit 750 supplies driving voltage to the remote controller receiving unit 700 and the microcontroller 500 and therefore, the remote controller receiving unit 700 and the microcontroller 500 may always receives the driving voltage regardless of the standby mode or the operation mode.

The independent power supplying unit 750 may be connected to a fourth transistor Q4, and a second diode 760 may be connected between the independent power supplying unit 750 and the fourth transistor Q4.

In the second diode 760, the anode thereof is connected to the independent power supplying unit 750, and the cathode thereof is connected to an emitter stage of the forth transistor Q4.

The forth transistor Q4 may be a PNP transistor. That is, the independent power supplying unit 750 may be connected to an emitter stage of the forth transistor Q4.

In the standby mode, since current is not input to a base stage of the forth transistor Q4, the power input to the emitter stage is passed to the collector of the forth transistor Q4, and therefore, the standby power may be supplied to the microcomputer 500.

On the other hand, in the operation mode, current is applied to the base stage of the transistor Q4 through the phase delay circuit 331 to block the independent power supplying unit 750.

Further, in the standby mode, the power is input to the power blocking unit 600 through the AC rectification unit 200, but a second integrated circuit IC2 of the power blocking unit 600 is not operated, thereby reducing the power to be consumed. That is, the power supplied by the independent power supplying unit 750 is input to the collector stage of a third transistor Q3 through the fourth transistor Q4 and the diode of the second integrated circuit IC2, but since turn on signal is not input through the remote controller receiving unit 700 connected to the base stage of the third transistor Q3, the third transistor Q3 is nonconductive, and therefore, the current do not flow into the second integrated circuit IC2 too, thereby not to consume the standby power. The third transistor Q3 may be a PNP transistor.

When the turn on signal is input through the remote controller receiving unit 700, the current is input to the base stage of the third transistor Q3 to operate the third transistor Q3. Therefore, when operating the second integrated circuit IC2 too, the current passing through the second integrated circuit IC2 is input to the base stage of the second transistor Q2 to operate the second transistor Q2.

The driving voltage $V_{CC2}$ output through the collector of the second transistor Q2 is input to the PFC 300 and the LLC resonance unit 400 to supply the driving voltage. As a result, output voltages Vout1, Vout2, Vout3 are output from the LLC resonance unit 400. A first and second output voltage Vout1, Vout2 are connected to loads to use as supplying power, and a third output voltage Vout3 is supplied to the microcomputer 500 through a first integrated circuit IC1.

The standby mode is the interval of idle state that does not require the driving of the load. In this interval, since the microcomputer 500 monitors whether the external input is produced and continually secures data and the like required for system operation, it should be activated.

As a result, the microcomputer 500 receives the driving voltage regardless of the standby mode and the operation mode.

The third output voltage Vout3 may be input to the base stage of the forth transistor Q4.

The phase delay circuit 331 may be formed in the base stage of the forth transistor Q4 to output the third output voltage Vout3. After a period of time passes, the forth transistor Q4 is turned off to block the independent power supplying unit 750. Then, the third output voltage Vout3 output from the LLC resonance unit 400 is supplied to the microcomputer 500. The phase delay circuit 331 may include resistors and capacitors.

As reviewed above, if the turn on signal is not input through the remote controller receiving unit 700, the power is supplied to the microcomputer 500 through the independent power supplying unit 750. If the turn on signal is input through the remote controller receiving unit 700, the power is supplied to the microcomputer 500 through the third output voltage Vout3.

As reviewed above, in the standby mode, the independent power supplying unit 750 supplies the driving voltage to the remote controller receiving unit 700 and the microcomputer 500 and the power blocking unit 600 is not operated, so which may reduce the standby power. Such a configuration may be realized by the integrated circuits and the transistor, to reduce the number of components and improve productivity.

The present invention may reduce real standby power by an independent power.

The present invention may reduce the standby power while normally operating electronic equipments in the standby state by periodically flowing the minimum power required for driving electrical equipments in the standby state of the electrical equipments.

Further, in the present invention, when the electrical equipments are switched from the standby state to the operating state, the electrical equipments may stably operate by continually supplying the power to the electrical equipments during switch connecting delay time generated from a standby power reducing apparatus.

It is appreciated that the present invention can be carried out in other specific forms without changing a technical idea or essential characteristics by one having ordinary skilled in the art to which the present invention pertains to. Therefore, embodiments described above are for illustration purpose in all respect but not limited to them. The scope of the present invention is represented by claims described below rather than the detailed description, and any change and variations derived from the meaning, the scope and the concept of equality of claims should be interpreted to be included to the scope of the present invention.

In addition, although the preferred embodiments of the present invention are shown and described above, the present invention is not limited to above-described specific embodiment and is variously modified by one skilled in the art without the gist of the present invention claimed in the claim, such that the modified embodiment is not to be understood separately from technical ideas or views of the present invention.

What is claimed is:

1. A standby power reducing module, comprising:
   a first power supplying unit for supplying an AC power;
   an AC rectification unit for receiving the AC power supplied from the first power supplying unit and converting the AC power into a first DC power;
   a resonance unit electrically connected to the AC rectification unit and supplying a first driving voltage by using the first DC power converted by the AC rectification unit;
   a power blocking unit blocking the first driving voltage of the resonance unit when a system is switched to a standby mode;
   a second power supplying unit separated from the first power supplying unit, charging a second DC power, and supplying a second driving voltage by using the second DC power when the system is switched to the standby mode, and connected to a remote controller receiving unit to supply a power required for an operation of a microcomputer in the standby mode;
   wherein the microcomputer is operated by the first driving voltage when the system is switched to a normal mode, and is operated by the second driving voltage when the system is switched to the standby mode;
   a first transistor connected to the second power supplying unit;
   a first diode connected between the first transistor and the second power supplying unit; and
   a phase delay circuit connected between the resonance unit and the first transistor and blocking the second power supplying unit;
   wherein a current is not input to a base stage of the first transistor in the standby mode, and a power input to an emitter stage of the first transistor is transmitted to a collector of the first transistor such that the second driving voltage is supplied to the microcomputer;
   wherein a current is applied to the base stage of the first transistor through the phase delay circuit, such that the second driving voltage is blocked;
   wherein the AC power, the first DC power, and the first driving voltage are not supplied to the second power supplying unit; and
   wherein the second power supplying unit autonomously supplies the second driving voltage by using the second DC power when the system is switched to the standby mode.

2. The standby power reducing module according to claim 1, wherein the second power supplying unit comprises a solar cell, a mercury cell or a secondary cell.

3. The standby power reducing module according to claim 1, wherein the AC rectification unit is a switching mode power supply.

4. The standby power reducing module according to claim 1, wherein the microcomputer blocks the AC power supplied by the first power supplying unit when the system is switched to the standby mode.

5. The standby power reducing module according to claim 1, wherein the remote controller receiving unit is electrically connected to the power blocking unit and the second power supplying unit.

6. The standby power reducing module according to claim 5, further comprising a second transistor, in which a base stage of the second transistor is connected to the remote controller receiving unit.

7. The standby power reducing module according to claim 1, wherein the emitter stage of the first transistor is connected to the second power supplying unit;
   wherein an anode of the first diode is connected to the second power supplying unit, and a cathode of the first diode is connected to the emitter stage of the first transistor; and wherein the phase delay circuit is connected between the resonance unit and the base stage of the first transistor.

8. The standby power reducing module according to claim 1, further comprising a Power Factor Correction (PFC) connected between the AC rectification unit and the resonance unit.

9. The standby power reducing module according to claim 1, wherein the power blocking unit includes an integrated circuit and a second transistor, and a base stage and an emitter stage of the second transistor are connected to the integrated circuit; and wherein the first driving voltage is selectively supplied to the microcomputer based on operations of the second transistor.

10. The standby power reducing module according to claim 8, wherein a collector stage of a second transistor is connected to the resonance unit and the Power Factor Correction (PFC); and wherein the resonance unit and the PFC are operated by the first driving voltage.

11. The standby power reducing module according to claim 8, further comprising a second diode connected between the PFC and the power blocking unit.

* * * * *